Aug. 20, 1929.  N. H. WILLIAMS ET AL  1,725,436
WINDSHIELD CLEANER
Filed Feb. 16, 1929
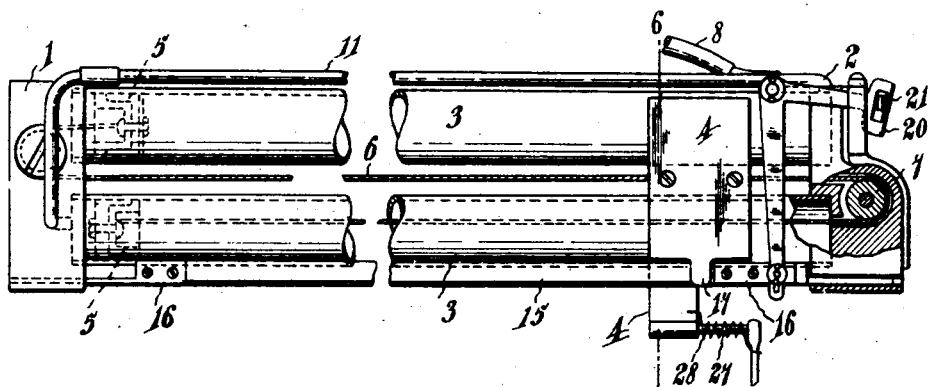
Fig. 1.
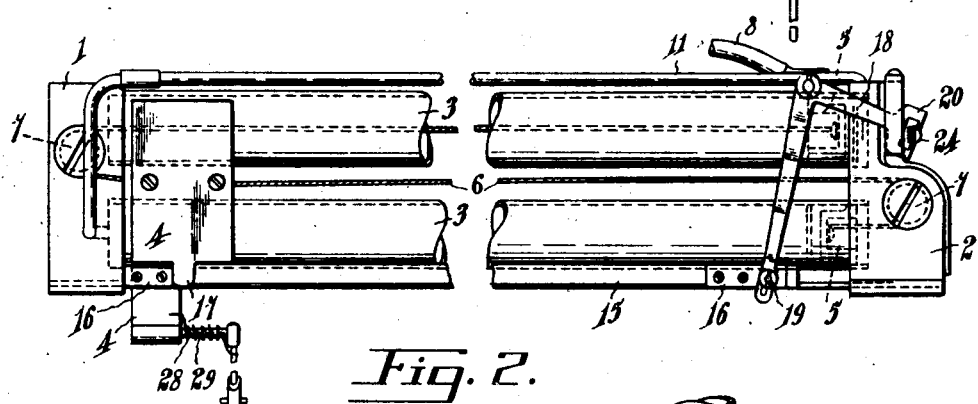
Fig. 2.
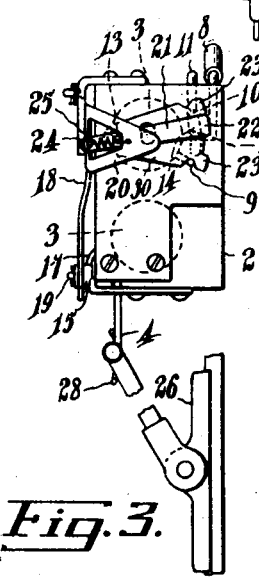
Fig. 3.
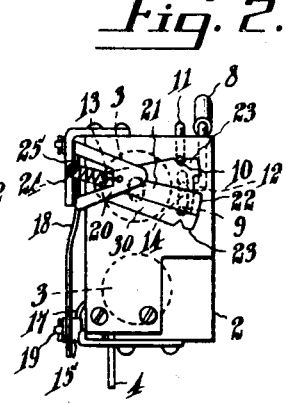
Fig. 4.
Fig. 6.
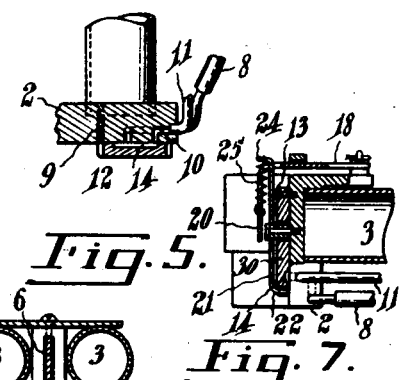
Fig. 5.
Fig. 7.
Inventors
N. H. Williams
H. Mittermeir
by J. Edw. Maybee
ATTY Patented Aug. 20, 1929.

1,725,436

UNITED STATES PATENT OFFICE.

NORMAN H. WILLIAMS AND HERMANN MITTERMEIR, OF KITCHENER, ONTARIO, CANADA.

WINDSHIELD CLEANER.

Application filed February 16, 1929. Serial No. 340,596.

This invention relates to devices for cleaning the surfaces of windshields and our object is to devise a cleaner operable by the suction of the engine of a motor vehicle and adapted to operate rectilinearly across the windshield.

We attain our object by means of a construction which may be briefly described as follows. Two cylinders are arranged in parallelism across the top of the windshield. These cylinders serve as guides for a wiper carrier. This carrier is operated by cables connected to pistons working in the cylinders and led round pulleys located adjacent one end of each cylinder. A suction pipe leads from the intake manifold of the engine and a valve is provided, operable by the carrier at either end of its stroke, adapted to form a communication between the suction pipe and each cylinder alternately so that a reciprocating motion is given to the carrier as long as the engine is operating.

The invention is hereinafter more fully described and is illustrated in the accompanying drawings in which Fig. 1 is a rear elevation, partly in section, of our improved wiper;

Fig. 2 is a similar view, showing the parts in a different position;

Fig. 3 is an end elevation looking at the right hand side of Fig. 1;

Fig. 4 is a similar view showing the valve in a different position;

Fig. 5 is a cross section through part of the valve showing the ports thereof;

Fig. 6 is a cross section on the line 6—6 in Fig. 1; and

Fig. 7 a side elevation, partly in section, of the valve.

The device is supported by means of two brackets 1 and 2 which are, when the device is in use, suitably secured to the vehicle above the windshield. These brackets receive the ends of two cylinders 3 which are mounted in parallel relationship with one another. These cylinders are adapted to support and guide the wiper carrier 4, which is preferably constructed substantially as shown in Fig. 6 of the drawings, to engage the backs and fronts of the cylinders as well as their contiguous parts. Each cylinder is open at one end as shown and is provided with a piston 5. To each piston is secured a cable 6 which passes through the open end of the cylinder round a guide roller 7 mounted in the adjacent bracket, thence passing to the wiper carrier to which it is suitably secured. The open ends of the cylinders are located at opposite ends of the device and it therefore follows that the cables 6 are secured to opposite sides of the wiper carrier 4. It also follows that the movement of one piston is imparted to the other and vice versa. The pistons are actuated by suction means normally forming part of the engine with which the vehicle is equipped, usually the intake manifold.

From the intake manifold (not shown) leads a suction pipe 8 to a port 12 of the valve supported by the end bracket 2. This valve is provided with a port 9 leading to the upper cylinder 3 adjacent its closed end. The valve is also provided with a port 10 connected by the pipe 11 with the interior of the lower cylinder 3 adjacent its closed end. The movable part of the valve is formed by a plate 30 pivoted at 13. It will be seen that this plate is so shaped that when rocked in one direction it opens the port 9, and when rocked in the other direction opens the port 10.

On the inner face of the plate is formed a channel 14, so proportioned that when the plate is in one position it will form a communication between the port 12 and the port 9, and when the plate is in its other position it will form a communication between the port 12 and the port 10. Thus, if the plate be oscillated, one or the other of the cylinders will be brought into communication with the suction pipe while the other is opened to the atmosphere and vice versa. Thus by actuating the valve the wiper carrier may be reciprocated on the cylinders as guides.

The valve shifting mechanism comprises the following parts. The shifter bar 15 is mounted to slide in the brackets 1 and 2. At opposite ends the shifter bar is provided with the shoulders 16 between which plays the projection 17 of the wiper carrier. The wiper carrier will thus move the bar in one direction when it reaches one end of the cylinders and in the other direction when it reaches the other end of the cylinders.

On the end bracket 2 is pivoted a bell crank lever 18, one arm of which, by means of a pin and slot connection 19, is connected with the shifter bar 15. The other end of the bell crank lever is bent at right angles to form a yoke 20 substantially parallel to the plate 12. This yoke spans a rock arm 21 pivoted intermediate its ends, one end being provided with a projection 22 playing between the shoulders 23 formed on the plate 12. The other end of the rock arm is provided with a projection 24 and plays between the sides of the yoke. From this construction it follows that, when the yoke 20 is moved in one direction, the rock arm is actuated to move the plate in one direction and, when the yoke is moved in the opposite direction, the plate also is moved in the opposite direction.

It will be noted, however, that lost motion is provided which allows of a snap-over mechanism being employed. To effect the snap-over we provide a coil spring 25 secured at one end to the yoke and at the other end to the adjacent end of the rock arm 21. This spring, as will be seen on reference to Figs. 3 and 4, tends to move the rock arm to its limit of movement in either direction as soon as it passes the dead center, thus effecting the snap-over.

It will be noted that the plate 12 is slotted to embrace the pivot of the rock arm 21 which is necessary, as the rock arm overlies the plate. A quick acting valve is thus provided which eliminates any possibility of the wiper carrier becoming stuck at either end of its travel. The wiper 26 may be of any ordinary construction and is preferably hinged on the wiper carrier by means of the spindle 27. A coil spring 28, wound on the spindle and engaged with the wiper and the wiper carrier, tends to press the wiper into contact with the windshield. We have referred to the parts 6 as "cables". While they may be cords or wires, we preferably form them of flexible bands as shown.

From the above description it will be seen that we have devised a windshield cleaner which will satisfactorily attain the objects of our invention as set out in the preamble to this specification.

What we claim is:

1. In a windshield wiper, the combination of two parallel cylinders arranged in juxtaposition; a wiper carrier mounted internally on said cylinders and slidable thereon as a guide; pistons movable in said cylinders; and means whereby reciprocating movements of the pistons are imparted to the wiper carrier.

2. In a windshield wiper the combination of two transverse cylinders arranged side by side; a wiper carrier mounted to move in the direction of the length of the cylinders; a piston mounted in each cylinder; a cable for each cylinder connected at one end to the wiper carrier and at the other end to the piston of the cylinder; guides at opposite ends of the device around which said cables are led to opposite sides of the wiper carrier; a shifter bar mounted to slide longitudinally of the device; a projection on the wiper carrier; contacts on the shifter bar with which said projection may engage to shift said bar; and a valve having ports for communication with the atmosphere, with suction means, and with the respective cylinders, said valve being shiftable by the shifter bar to bring said cylinders alternately into connection with the suction and the atmosphere as the shifter bar is moved.

3. In a windshield wiper the combination of two transverse cylinders arranged side by side; a wiper carrier mounted to move in the direction of the length of the cylinders; a piston mounted in each cylinder; a cable for each cylinder connected at one end to the wiper carrier and at the other end to the piston of the cylinder; guides at opposite ends of the device around which said cables are led to opposite sides of the wiper carrier; a valve having ports for communication with the atmosphere, with suction means and with the respective cylinders; and means for actuating said valve from the wiper carrier to bring said cylinders alternately into connection with the suction and the atmosphere as the wiper carrier is reciprocated.

4. In a windshield wiper the combination of two transverse cylinders arranged side by side; a wiper carrier mounted to move in the direction of the length of the cylinders; a piston mounted in each cylinder; a cable for each cylinder connected at one end to the wiper carrier and at the other end to the piston of the cylinder; guides at opposite ends of the device around which said cables are led to opposite sides of the wiper carrier; a valve block having three ports therein, one for connection with a source of suction and two connected with the said cylinders; an oscillatable plate adapted to bring either of the cylinder ports in communication with the suction and the other in communication with the atmosphere or vice versa; "snap-over" mechanism adapted to actuate said plate; and means for actuating said snap-over mechanism to actuate the plate as the wiper carrier is reciprocated.

5. In a windshield wiper the combination of two end brackets; two cylinders mounted in said brackets side by side, each with one end closed and the other end open, the open ends being at opposite ends of the cylinders; a pulley mounted in each bracket; a wiper carrier mounted to slide in the direction of the length of the cylinders; a cable for each cylinder secured to the piston thereof, passing round one of the pulleys and secured to the wiper carrier; a valve having ports for communication with the atmosphere, with suction means and with the respective cylinders; and means for actuating said valve from the wiper carrier to bring said cylinders alternately into connection with the suction and the atmosphere as the wiper carrier is reciprocated.

6. In a windshield wiper the combination of two transverse cylinders arranged side by side; a wiper carrier mounted to move in the direction of the length of the cylinders; a piston mounted in each cylinder; a cable for each cylinder connected at one end to the wiper carrier and at the other end to the piston of the cylinder; guides at opposite ends of the device around which said cables are led to opposite sides of the wiper carrier; a valve block having three ports therein, one for connection with a source of suction and two connected with the said cylinders; an oscillatable plate adapted to bring either of the cylinder ports in communication with the suction and the other in communication with the atmosphere or vice versa; a pivoted rock arm; a lost motion connection whereby the rock arm may oscillate the said plate from one position to the other; a spring tending to hold the said parts in one position or the other; a lever adapted to actuate said rock arm; and means for actuating said lever as the wiper carrier is reciprocated to move the rock arm.

7. In a windshield wiper the combination of two transverse cylinders arranged side by side; a wiper carrier mounted to move in the direction of the length of the cylinders; a piston mounted in each cylinder; a cable for each cylinder connected at one end to the wiper carrier and at the other end to the piston of the cylinder; guides at opposite ends of the device around which said cables are led to opposite sides of the wiper carrier; a valve block having three ports therein, one for connection with a source of suction and two connected with the said cylinders; an oscillatable plate adapted to bring either of the cylinder ports in communication with the suction and the other in communication with the atmosphere or vice versa; a pivoted rock arm; a lost motion connection whereby the rock arm may oscillate the said plate from one position to the other; a spring tending to hold the said parts in one position or the other; a bell crank lever having one arm adapted to actuate said rock arm and the other engaged with a shifter bar; a shifter bar mounted to slide longitudinally of the device; a projection on the wiper carrier; and contacts on the shifter bar with which said projection may engage to shift said bar as the wiper carrier reaches opposite ends of its stroke.

Signed at Kitchener, Ont., this 31st day of January, 1929.

HERMANN MITTERMEIR.
NORMAN H. WILLIAMS.